US012344554B2

(12) United States Patent
Ono et al.

(10) Patent No.: US 12,344,554 B2
(45) Date of Patent: Jul. 1, 2025

(54) GLASS SUBSTRATE FOR HIGH FREQUENCY DEVICE, LIQUID CRYSTAL ANTENNA AND HIGH FREQUENCY DEVICE

(71) Applicant: AGC Inc., Tokyo (JP)

(72) Inventors: Kazutaka Ono, Tokyo (JP); Yusaku Matsuo, Tokyo (JP); Shuhei Nomura, Tokyo (JP)

(73) Assignee: AGC Inc., Tokyo (JP)

( * ) Notice: Subject to any disclaimer, the term of this patent is extended or adjusted under 35 U.S.C. 154(b) by 907 days.

(21) Appl. No.: 17/319,270

(22) Filed: May 13, 2021

(65) Prior Publication Data

US 2021/0261456 A1    Aug. 26, 2021

Related U.S. Application Data

(63) Continuation of application No. PCT/JP2019/044196, filed on Nov. 11, 2019.

(30) Foreign Application Priority Data

Nov. 14, 2018 (JP) ................................. 2018-213526

(51) Int. Cl.
*C03C 3/089* (2006.01)
*C03C 3/085* (2006.01)
*C03C 3/091* (2006.01)
*C03C 4/16* (2006.01)
*H01Q 1/22* (2006.01)
*H01Q 1/38* (2006.01)

(52) U.S. Cl.
CPC .............. *C03C 3/089* (2013.01); *C03C 3/085* (2013.01); *C03C 3/091* (2013.01); *C03C 4/16* (2013.01); *H01Q 1/2283* (2013.01); *H01Q 1/2291* (2013.01); *H01Q 1/38* (2013.01); *C03C 2204/08* (2013.01)

(58) Field of Classification Search
CPC ......... C03C 3/089; C03C 3/091; C03C 3/093; C03C 3/095; C03C 3/085; C03C 4/16
See application file for complete search history.

(56) References Cited

U.S. PATENT DOCUMENTS

| | | | |
|---|---|---|---|
| 7,141,821 B1 | 11/2006 | Yamazaki et al. | |
| 10,974,987 B2* | 4/2021 | Ono | H05K 1/024 |
| 11,594,811 B2* | 2/2023 | Nomura | C03C 3/091 |
| 11,708,294 B2* | 7/2023 | Ono | C03C 3/091 |
| | | | 501/59 |
| 2005/0151116 A1 | 7/2005 | Fechner et al. | |
| 2006/0006786 A1 | 1/2006 | Fechner et al. | |
| 2006/0009343 A1 | 1/2006 | Fechner et al. | |
| 2006/0010917 A1 | 1/2006 | Fechner et al. | |
| 2006/0120105 A1 | 6/2006 | Fechner et al. | |
| 2006/0287185 A1 | 12/2006 | Creux et al. | |
| 2007/0001236 A1 | 1/2007 | Yamazaki et al. | |
| 2009/0109654 A1 | 4/2009 | Fechner et al. | |
| 2009/0270242 A1 | 10/2009 | Yanase et al. | |
| 2010/0045164 A1 | 2/2010 | Fechner et al. | |
| 2010/0084016 A1 | 4/2010 | Aitken et al. | |
| 2011/0017297 A1 | 1/2011 | Aitken et al. | |
| 2012/0132282 A1 | 5/2012 | Aitken et al. | |
| 2013/0037105 A1 | 2/2013 | Aitken et al. | |
| 2013/0255779 A1 | 10/2013 | Aitken et al. | |
| 2014/0150867 A1 | 6/2014 | Aitken et al. | |
| 2014/0158201 A1 | 6/2014 | Aitken et al. | |
| 2014/0335331 A1 | 11/2014 | Ellison et al. | |
| 2015/0030827 A1 | 1/2015 | Gomez et al. | |
| 2015/0037553 A1 | 2/2015 | Mauro | |
| 2015/0051060 A1 | 2/2015 | Ellison et al. | |
| 2015/0051061 A1 | 2/2015 | Kiczenski et al. | |
| 2015/0158758 A1 | 6/2015 | Aiken et al. | |
| 2015/0210583 A1 | 7/2015 | Amosov et al. | |
| 2016/0145146 A1 | 5/2016 | Aitken et al. | |
| 2016/0185650 A1 | 6/2016 | Himei et al. | |
| 2016/0236972 A1 | 8/2016 | Kiczenski et al. | |
| 2016/0347639 A1 | 12/2016 | Hu et al. | |
| 2017/0217827 A1 | 8/2017 | Aitken et al. | |
| 2017/0291845 A1 | 10/2017 | Ellison et al. | |
| 2018/0370837 A1 | 12/2018 | Hu et al. | |
| 2019/0023606 A1 | 1/2019 | Kiczenski et al. | |
| 2019/0210911 A1* | 7/2019 | Ono | C03C 3/089 |
| 2019/0265524 A1 | 8/2019 | Asagi et al. | |
| 2019/0352213 A1* | 11/2019 | Letz | C03C 4/10 |
| 2020/0123043 A1 | 4/2020 | Ono et al. | |

FOREIGN PATENT DOCUMENTS

| | | | | |
|---|---|---|---|---|
| CN | 102503153 A | * | 6/2012 | ............. C03C 3/091 |
| CN | 102863152 A | * | 1/2013 | |

(Continued)

OTHER PUBLICATIONS

International Search Report issued Dec. 17, 2019 in PCT/JP2019/044196 filed on Nov. 11, 2019, citing documents AJ, AW-AY & BB-BE therein.
Extended European Search Report issued Jul. 12, 2022 in European Patent Application No. 19883771.8, citing references AH-AI and AN-AS therein, 9 pages.

*Primary Examiner* — Elizabeth A. Bolden
(74) *Attorney, Agent, or Firm* — Oblon, McClelland, Maier & Neustadt, L.L.P.

(57) ABSTRACT

A glass substrate for high-frequency devices includes, in terms of molar percentage based on oxides: one or more alkaline-earth metal oxides in a total amount of 0.1 to 13%; $Al_2O_3$ and $B_2O_3$ in a total amount of 1 to 40%, in which a molar ratio of the contents represented by $Al_2O_3/(Al_2O_3+B_2O_3)$ is 0 to 0.45; at least one oxide selected from the group consisting of $Sc_2O_3$, $TiO_2$, $ZnO$, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$, in a total amount of 0.1 to 1.0%; and $SiO_2$ as a main component. The glass substrate has a dielectric dissipation factor at 35 GHz of 0.007 or less.

9 Claims, 1 Drawing Sheet

(56) References Cited

FOREIGN PATENT DOCUMENTS

| | | |
|---|---|---|
| CN | 103011584 A | 4/2013 |
| CN | 104628253 A | 5/2015 |
| CN | 105307994 A | 2/2016 |
| DE | 10 2005 000 663 A1 | 11/2006 |
| JP | 8-295530 A | 11/1996 |
| JP | 2000-208778 A | 7/2000 |
| JP | 2004-244271 A | 9/2004 |
| JP | 2006-193386 A | 7/2006 |
| JP | 2011-42509 A | 3/2011 |
| JP | 2016-528152 A | 9/2016 |
| KR | 10-2006-0108283 A | 10/2006 |
| KR | 20060108283 A * | 10/2006 |
| WO | WO 2007/119705 A1 | 10/2007 |
| WO | WO 2018/012490 A1 | 1/2018 |
| WO | WO-2018051793 A1 * | 3/2018 ............. C03B 17/02 |

* cited by examiner

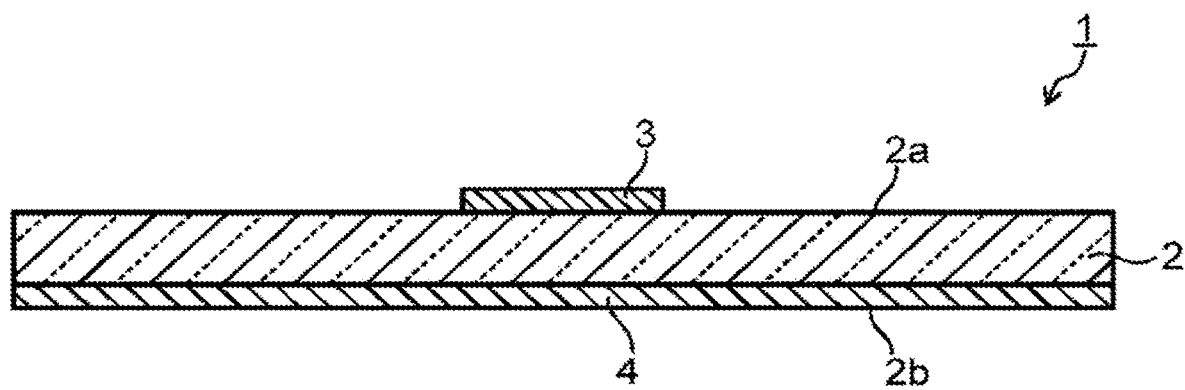

GLASS SUBSTRATE FOR HIGH FREQUENCY DEVICE, LIQUID CRYSTAL ANTENNA AND HIGH FREQUENCY DEVICE

TECHNICAL FIELD

The present invention relates to a glass substrate for high-frequency devices and to a liquid-crystal antenna and a high-frequency device each including the glass substrate.

BACKGROUND ART

In the field of electronic devices such as communication appliances such as cell phones, smartphones, personal digital assistants and Wi-Fi appliances, surface acoustic wave (SAW) devices, radar components, and antenna components, use of higher signal frequencies is being advanced in order to increase the communication capacity, heighten the communication speed, etc. Circuit boards for use in electronic appliances for such high-frequency applications typically employ insulating substrates such as resin substrates, ceramic substrates, and glass substrates. The insulating substrates for use in high-frequency devices are required to reduce transmission losses based on dielectric loss, conductor loss, etc. in order to ensure the quality, intensity, and other properties of high-frequency signals.

Among such insulating substrates, resin substrates have low rigidity due to the nature thereof. Because of this, it is difficult to apply resin substrates in the case where rigidity (strength) is required for the semiconductor package products. Ceramic substrates have a drawback in that it is difficult to heighten the surface smoothness thereof and this is prone to result in an increased conductor loss due to the conductor formed on the substrate surface. Meanwhile, glass substrates are characterized by having high rigidity to make size and thickness reductions, etc. of packages easy, and by having excellent surface smoothness and being easily produced as larger-size substrates.

However, conventional alkali-free glass substrates, although effective at frequencies up to about 20 GHz in attaining reductions in dielectric loss and reductions in transmission loss based thereon, have limitations in attaining a dielectric-loss reduction in a range of higher frequencies exceeding, for example, 30 GHz. Because of this, in circuit boards employing conventional alkali-free glass substrates, it is difficult to maintain the quality, intensity, and other properties of high-frequency signals having frequencies exceeding 30 GHz. Meanwhile, quartz glass substrates can maintain a low dielectric loss even in a range of frequencies exceeding 30 GHz. However, quartz glass substrates have too low a thermal expansion coefficient and hence there is too large a difference in thermal expansion coefficient between the quartz glass substrates and other members in a configuration of electronic devices. This is a factor which reduces the suitability for practical use of the electronic devices.

Patent Literature 1 discloses a lead-free glass which has a relative permittivity of 4.3 or less and a dielectric loss of 0.0035 or less at 35 GHZ. Patent Literature 1 states that in the lead-free glass, $B_2O_3$ is an essential component which lowers the permittivity ε and the dielectric dissipation factor tan δ.

It is hence considered that increasing the content of $B_2O_3$ might be effective in lowering the dielectric loss in a range of high frequencies exceeding 30 GHz.

CITATION LIST

Patent Literature

Patent Literature 1: JP-A-2004-244171

SUMMARY OF INVENTION

Technical Problem

However, increased $B_2O_3$ contents lead to deterioration of the acid resistance of the glass. In steps for producing circuit boards for liquid-crystal antennas, high-frequency devices, or the like, pickling is performed as a pretreatment for preparation for forming a wiring layer on the glass substrate. In the case where the glass has low acid resistance, a surface layer of the substrate is dissolved away during the pickling so that the surface smoothness of the substrate is impaired and this may reduce the adhesion of a film to be formed on the substrate surface. In addition, the dissolved substance may adhere to the substrate surface. There is hence the possibility of resulting in an increase in conductor loss attributable to the conductor to be formed on the substrate surface.

Meanwhile, glass substrates for use in high-frequency devices are required to have high glass homogeneity. When a glass substrate in which the glass has low homogeneity is pickled, the substrate surface may come to have local irregularities and hence impaired smoothness. This results in an increase in conductor loss due to the conductor formed on the substrate surface.

An object of the present invention is to provide a glass substrate for high-frequency devices which has a low dielectric dissipation factor in a high-frequency range, has high glass homogeneity and is hence less apt to opacify, and has excellent acid resistance.

Solution to Problem

The present inventors diligently made investigations and, as a result, have discovered that the object is accomplished by employing the following configurations.

(1) A glass substrate for high-frequency devices, the glass substrate including, in terms of molar percentage based on oxides: one or more alkaline-earth metal oxides in a total amount of 0.1 to 13%; $Al_2O_3$ and $B_2O_3$ in a total amount of 1 to 40%, in which a molar ratio of the contents represented by $Al_2O_3/(Al_2O_3+B_2O_3)$ is 0 to 0.45; at least one oxide selected from the group consisting of $Sc_2O_3$, $TiO_2$, ZnO, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$, in a total amount of 0.1 to 1.0%; and $SiO_2$ as a main component, in which the glass substrate has a dielectric dissipation factor at 35 GHz of 0.007 or less.

(2) The glass substrate for high-frequency devices according to (1), including $ZrO_2$ in an amount of 0.25 to 1.0% in terms of molar percentage based on oxides.

(3) The glass substrate for high-frequency devices according to (1) or (2), including $Y_2O_3$ in an amount of 0.1 to 0.5% in terms of molar percentage based on oxides.

(4) A glass substrate for high-frequency devices, the glass substrate including, in terms of molar percentage based on oxides: one or more alkaline-earth metal oxides in a total amount of 0.1 to 13%; $Al_2O_3$ and $B_2O_3$ in a total amount of 1 to 40%, in which a molar ratio of the contents represented by $Al_2O_3/(Al_2O_3+B_2O_3)$ is 0 to 0.45; at least one of ZnO and $ZrO_2$ in a total amount of 1.5 to 4.0%; and $SiO_2$ as a main component, in which the glass substrate has a dielectric dissipation factor at 35 GHz of 0.007 or less.

(5) The glass substrate for high-frequency devices according to any one of (1) to (4), in which at least one main surface of the glass substrate has a surface roughness of 1.5 nm or less in terms of arithmetic average roughness Ra.

(6) The glass substrate for high-frequency devices according to any one of (1) to (5), including one or more alkali metal oxides in a total amount of 0.001 to 5% in terms of molar percentage based on oxides, in which out of the alkali metal oxides, a molar ratio of contents represented by $Na_2O/(Na_2O+K_2O)$ is 0.01 to 0.99.

(7) The glass substrate for high-frequency devices according to any one of (1) to (6), including Fe in an amount of 0.005 to 0.12% in terms of a content of $Fe_2O_3$.

(8) The glass substrate for high-frequency devices according to any one of (1) to (7), including Sn in an amount of 0.25% or less in terms of a content of $SnO_2$.

(9) The glass substrate for high-frequency devices according to any one of (1) to (8), having a devitrification temperature of 1,400° C. or lower.

(10) The glass substrate for high-frequency devices according to any one of (1) to (9), having a temperature $T_2$ of 1,700° C. or lower, the temperature $T_2$ being a temperature at which the glass has a viscosity of $10^2$ dPa·s.

(11) A liquid-crystal antenna, including the glass substrate according to any one of (1) to (10).

(12) A high-frequency device, including the glass substrate according to any one of (1) to (10).

Advantageous Effects of Invention

The glass substrate for high-frequency devices of the present invention can reduce the dielectric loss of high-frequency signals. Circuit boards employing this glass substrate can reduce the transmission loss of high-frequency signals and practical high-frequency devices such as electronic devices can be provided.

The glass substrate for high-frequency devices of the present invention has excellent acid resistance. Because of this, when the glass substrate is pickled in a step for producing circuit boards for a liquid-crystal antenna, high-frequency device, etc., the glass substrate does not suffer from the dissolution of a substrate surface layer to come to have impaired surface smoothness or the adhesion of a dissolved substance to the substrate surface. Consequently, the adhesion of a film to be formed on the substrate surface can be prevented from decreasing. In addition, conductor loss can be prevented from increasing.

Furthermore, the glass substrate for high-frequency devices of the present invention has high glass homogeneity. This prevents local irregularities from being formed in the substrate surface when the glass substrate is pickled. This also can bring about a reduction in the transmission loss of high-frequency signals.

BRIEF DESCRIPTION OF DRAWINGS

FIGURE is a cross-sectional view illustrating an example of the configuration of a high-frequency circuit, the view illustrating the configuration of a circuit board according to an embodiment.

DESCRIPTION OF EMBODIMENTS

Embodiments of the present invention are explained. Each numerical range given with "to" includes the numerical values that precede and succeed the "to", as the lower limit and the upper limit, respectively. The content of each component in a glass substrate is given in terms of molar percent (mol %) based on oxides unless otherwise indicated. In this description, the term "high-frequency" means frequencies of 10 GHz or higher, preferably higher than 30 GHz, more preferably 35 GHz or higher.

FIGURE illustrates a circuit board for a high-frequency device according to an embodiment of the present invention. The circuit board 1 illustrated in FIGURE includes a glass substrate 2 having insulating properties, a first wiring layer 3 formed on a first main surface 2a of the glass substrate 2, and a second wiring layer 4 formed on a second main surface 2b of the glass substrate 2. The first and second wiring layers 3 and 4 form microstrip lines as an example of transmission lines. The first wiring layer 3 constitutes signal wiring and the second wiring layer 4 constitutes ground wiring. However, the structures of the first and second wiring layers 3 and 4 are not limited to these, and the wiring layers may have been formed only on one main surface of the glass substrate 2.

The first and second wiring layers 3 and 4 are layers formed by a conductor and have a thickness of usually about 0.1 μm to 50 μm. The conductor which constitutes the first and second wiring layers 3 and 4 is not particularly limited, and use is made, for example, of metals such as steel, gold, silver, aluminum, titanium, chromium, molybdenum, tungsten, platinum, nickel, and copper, alloys or metal compounds containing at least one of these metals, etc. The structures of the first and second wiring layers 3 and 4 are not limited to a single-layer structure, and the wiring layers 3 and 4 may have a structure including a plurality of layers, such as a multilayer structure including a titanium layer and a copper layer. Methods for forming the first and second wiring layers 3 and 4 are not particularly limited. For example, various known formation methods can be applied, such as a printing method in which a conductor paste is used, dipping, plating, vapor deposition, and sputtering.

The glass substrate 2 includes a glass substrate for a high-frequency device according to an embodiment of the present invention and has the property of having a dielectric dissipation factor (tan δ) at 35 GHz of 0.007 or less. The glass substrate 2 preferably has a relative permittivity at 35 GHz of 10 or less. Since the glass substrate 2 has a dielectric dissipation factor at 35 GHz of 0.007 or less, this glass substrate 2 can reduce dielectric loss in the range of frequencies exceeding 30 GHz. Also by regulating the relative permittivity at 35 GHz of the glass substrate 2 to 10 or less, the dielectric loss in a high-frequency range can be reduced. The dielectric dissipation factor at 35 GHz of the glass substrate 2 is more preferably 0.005 or less, even more preferably 0.003 or less. The relative permittivity at 35 GHz of the glass substrate 2 is more preferably 7 or less, even more preferably 6 or less, especially preferably 5 or less.

The main surfaces 2a and 2b of the glass substrate 2, on which the first and second wiring layers 3 and 4 are to be formed, preferably have a surface roughness of 1.5 nm or less in terms of arithmetic average roughness Ra. Since the main surfaces 2a and 2b of the glass substrate 2, on which the first and second wiring layers 3 and 4 are to be formed, have an arithmetic average roughness Ra of 1.5 nm or less, a skin resistance of the first and second wiring layers 3 and 4 can be reduced even when a skin effect has occurred in the first and second wiring layers 3 and 4 in a high-frequency range exceeding 30 GHz, thereby attaining a reduction in conductor loss. The arithmetic average roughness Ra of the main surfaces 2a and 2b of the glass substrate 2 is more preferably 1.0 nm or less, even more preferably 0.5 nm or less. The term "main surface of the glass substrate 2" means a surface on which a wiring layer is to be formed. In the case where the wiring layers are formed on one main surface, it is only required that the one main surface on which the wiring layers are formed should have an arithmetic average roughness Ra of 1.5 nm or less. The term "surface roughness Ra" in this description means a value obtained in accordance with JIS B0601 (year 2001).

The surface roughness of the main surfaces 2a and 2b of the glass substrate 2 can be attained by subjecting the surfaces of the glass substrate 2 to a polishing treatment or the like according to need. The surfaces of the glass substrate 2 can be polished, for example, by: polishing with an abrasive including cerium oxide, colloidal silica, or the like as a main component and with a polishing pad; polishing in which a polishing slurry, which includes an abrasive and an acidic or alkaline dispersion medium, and a polishing pad are used; or polishing in which an acidic or alkaline etchant is used. These polishing treatments are used in accordance with the surface roughness of a raw plate of the glass substrate 2. For example, preliminary polishing and finish polishing may be conducted in combination. It is preferable to chamfer the edge surfaces of the glass substrate 2 in order to prevent the glass substrate 2, when being processed, from suffering breakage, cracking, or chipping which occurs from an edge surface. The chamfering may be any of C-chamfering, R-chamfering, light-chamfering, etc.

Due to the use of the glass substrate 2 having such properties, the circuit board 1 can have a reduced transmission loss at 35 GHz, preferably, reduced to 1 dB/cm or less. Consequently, the quality, intensity, and other properties of high-frequency signals, in particular, high-frequency signals having a frequency exceeding 30 GHz and even high-frequency signals of 35 GHz or higher, are maintained. Thus, a glass substrate 2 and a circuit board 1 that are suitable for high-frequency devices in which such high-frequency signals are processed can be provided. Namely, the characteristics and quality of high-frequency devices in which such high-frequency signals are processed can be improved. The transmission loss at 35 GHz of the circuit board 1 is more preferably 0.5 dB/cm or less.

A glass substrate 2 having the above-described dielectric properties including dielectric dissipation factor and being excellent in acid resistance can be attained by forming a glass substrate including $SiO_2$ as a main component and as a network-forming substance so that the glass substrate satisfies requirements (1), (2) and (3) which are shown below. The glass substrate 2 is formed by melting and hardening a raw-material composition. Although methods for producing the glass substrate 2 are not particularly limited, use can be made, for example, of a method in which a molten glass is formed into a sheet having a given thickness by the float process and the sheet is annealed and then cut into a desired shape to obtain a plate glass.

The term "glass" in this description means a solid which is amorphous, as defined, and shows glass transition. The term does not mean a crystallized glass, which is a mixture of a glass and crystals, or a sintered glass which contains a crystalline filler. Amorphous glass can be ascertained by examining the glass by X-ray diffractometry and ascertaining the absence of any distinctive diffraction peak.

In this description, the expression "including $SiO_2$ as a main component" means that the content of $SiO_2$, in component proportion in terms of mole percent based on oxides, is the highest.

Requirement (1): the glass substrate 2 includes alkaline earth metal oxides in a total content of 0.1 to 13%.

With respect to requirement (1), examples of the alkaline earth metal oxides include MgO, CaO, SrO, and BaO. These oxides each function as a component which enhances glass meltability. In the case where the total content of such alkaline earth metal oxides is 13% or less, the dielectric loss of the glass substrate 2 can be reduced. The total content of alkaline earth metal oxides is more preferably 11% or less, even more preferably 10% or less, particularly preferably 8% or less, most preferably 6% or less. Meanwhile, in the case where the total content of alkaline earth metal oxides is 0.1% or higher, satisfactory glass meltability can be maintained. The total content of alkaline earth metal oxides is more preferably 1% or higher, much more preferably 3% or higher, especially preferably 4% or higher, most preferably 5% or higher.

MgO is a component which heightens the Young's modulus without increasing the specific gravity. Namely, MgO is a component heightening the specific modulus, thereby mitigating the problem of deflection and improving the fracture toughness to enhance the glass strength. MgO is also a component which improves meltability. Although MgO is not an essential component, in the case where MgO is contained, the content of MgO is preferably 0.1% or higher, more preferably 1% or higher, even more preferably 3% or higher. In the case where the content of MgO is 0.1% or higher, the effects of the inclusion of MgO can be sufficiently obtained and the thermal expansion coefficient can be inhibited from becoming too low. The content of MgO is preferably 13% or less, more preferably 12% or less, more preferably 11% or less, more preferably 10% or less, more preferably 9% or less, more preferably 8% or less, particularly preferably 7% or less. In the case where the content of MgO is 13% or less, the devitrification temperature can be inhibited from rising.

CaO is a component which has the feature of being next to MgO, among the alkaline earth metal oxides, in heightening the specific modulus and of not excessively lowering the strain point and which improves meltability like MgO. CaO further has the feature of being less apt to heighten the devitrification temperature as compared with MgO. Although CaO is not an essential component, in the case where CaO is contained, the content of CaO is preferably 0.1% or higher, more preferably 1% or higher, even more preferably 3% or higher. In the case where the content of CaO is 0.1% or higher, the effects of the inclusion of CaO can be sufficiently obtained. The content of CaO is preferably 13% or less, more preferably 10% or less, more preferably 8% or less, more preferably 7% or less, more preferably 6% or less, particularly preferably 5.5% or less, most preferably 5% or less. In the case where the content of CaO is 13% or less, the glass is prevented from having too high an average thermal expansion coefficient and is inhibited from increasing in devitrification temperature, thereby preventing devitrification during glass production.

SrO is a component which improves meltability without heightening the devitrification temperature of the glass. Although SrO is not an essential component, in the case where SrO is contained, the content of SrO is preferably 0.1% or higher, preferably 0.5% or higher, more preferably 1.0% or higher, even more preferably 1.5% or higher, especially preferably 2% or higher. In the case where the content of SrO is 0.1% or higher, the effect of the inclusion of SrO can be sufficiently obtained. The content of SrO is preferably 13% or less, more preferably 10% or less, even more preferably 7% or less, especially preferably 5% or less.

In the case where the content of SrO is 13% or less, the glass can be prevented from having too high a specific gravity and be inhibited from having too high an average thermal expansion coefficient.

BaO, although not essential, is a component which improves meltability without heightening the devitrification temperature of the glass. However, in the case where BaO is contained in too large an amount, the glass tends to have too high a specific gravity, a reduced Young's modulus, an increased relative permittivity, and too high an average thermal expansion coefficient. Because of this, the content of BaO is preferably 10% or less, preferably 8% or less, more preferably 5% or less, even more preferably 3% or less. It is especially preferable that the glass substrate contains substantially no BaO.

In this description, the wording "containing substantially no . . . " means that the ingredient is not contained except for that which has come into the glass as an unavoidable impurity from raw materials, etc. Namely, that wording means that the ingredient is not incorporated on purpose. In the present invention, the expression "the glass contains substantially no BaO" means that the content thereof is, for example, 0.3% or less.

Requirement (2): the glass substrate 2 includes $Al_2O_3$ and $B_2O_3$ in a total content of 1 to 40% and a molar ratio of the contents represented by $Al_2O_3/(Al_2O_3+B_2O_3)$ is 0 to 0.45.

With respect to requirement (2), $Al_2O_3$ is not essential. However, $Al_2O_3$ is a component which is effective in improving the weatherability, inhibiting the glass from separating into phases, lowering the thermal expansion coefficient, etc. In the case where $Al_2O_3$ is contained, the content of $Al_2O_3$ is preferably 1% or more, more preferably 3% or more, more preferably 5% or more, more preferably 6% or more, more preferably 7% or more, particularly preferably 8% or more. Further, the content of $Al_2O_3$ is preferably 15% or less, more preferably 13% or less, more preferably 11% or less, particularly preferably 10% or less.

$B_2O_3$ is a component which is effective in improving glass meltability, lowering the devitrification temperature, etc. The content of $B_2O_3$ is preferably 1% or more, more preferably 3% or more, more preferably 5% or more, more preferably 7% or more, more preferably 9% or more, more preferably 11% or more, more preferably 13% or more, more preferably 15% or more, more preferably 17% or more, more preferably 17.5% or more, more preferably 18% or more, more preferably 18.5% or more, more preferably 19% or more, particularly preferably 19.5% or more, most preferably 20% or more. Further, the content of $B_2O_3$ is preferably 30% or less, more preferably 28% or less, more preferably 26% or less, particularly preferably 24% or less.

With respect to requirement (2), in the case where the molar ratio of the contents represented by $Al_2O_3/(Al_2O_3+B_2O_3)$ is 0.45 or less, the dielectric loss of the glass substrate 2 can be reduced. The molar ratio of the contents represented by $Al_2O_3/(Al_2O_3+B_2O_3)$ may be 0. The molar ratio of the contents represented by $Al_2O_3/(Al_2O_3+B_2O_3)$ is more preferably 0.4 or less, even more preferably 0.3 or less, more preferably 0.28 or less, more preferably 0.25 or less, more preferably 0.23 or less, particularly preferably 0.2 or less. The molar ratio of the contents represented by $Al_2O_3/(Al_2O_3+B_2O_3)$ is preferably 0.01 or higher, more preferably 0.02 or higher, more preferably 0.03 or higher, more preferably 0.04 or higher, more preferably 0.05 or higher, more preferably 0.06 or higher, more preferably 0.07 or higher, more preferably 0.08 or higher, particularly preferably 0.09 or higher.

In the case where the total content of $Al_2O_3$ and $B_2O_3$ (including the case where the content of $Al_2O_3$ is 0) is 1% or higher, the glass can have enhanced meltability, etc. The total content of $Al_2O_3$ and $B_2O_3$ is more preferably 3% or higher, more preferably 5% or higher, more preferably 7% or higher, more preferably 9% or higher, more preferably 11% or higher, more preferably 13% or higher, more preferably 15% or higher, more preferably 17% or higher, more preferably 19% or higher, more preferably 21% or higher, more preferably 23% or higher, more preferably 25% or higher, more preferably 26% or higher, more preferably 27% or higher, particularly preferably 28% or higher, most preferably 29% or higher. In the case where the total content of $Al_2O_3$ and $B_2O_3$ (including the case where the content of $Al_2O_3$ is 0) is 40% or less, the dielectric loss of the glass substrate 2 can be reduced while maintaining glass meltability, etc. The total content of $Al_2O_3$ and $B_2O_3$ is more preferably 37% or less, even more preferably 35% or less, especially preferably 33% or less.

In the case where the content of $Al_2O_3$ is 15% or less, glass meltability and other properties are satisfactory. The content of $Al_2O_3$ is more preferably 14% or less. The content of $Al_2O_3$ is more preferably 0.5% or higher. In the case where the content of $B_2O_3$ is 30% or less, the glass substrate can have a satisfactory strain point. The content of $B_2O_3$ is more preferably 28% or less, more preferably 26% or less, more preferably 24% or less, more preferably 23% or less, more preferably 21% or less, more preferably 19% or less, particularly preferably 18% or less, most preferably 17% or less. Meanwhile, in the case where the content of $B_2O_3$ is 9% or higher, the meltability is improved. The content of $B_2O_3$ is more preferably 13% or higher, even more preferably 15% or higher.

As described above, in the case where requirements (1) and (2) are satisfied, the glass substrate 2 can have a dielectric dissipation factor at 35 GHz of 0.007 or less. However, in the case where the content of $B_2O_3$ is high, the acid resistance of the glass is degraded. In the case where the glass substrate 2 satisfies requirement (3A) or requirement (3B) as requirement (3), the acid resistance of the glass is improved.

Requirement (3A): the glass substrate 2 contains at least one oxide selected from the group consisting of $Sc_2O_3$, $TiO_2$, $ZnO$, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$ (hereinafter often referred to as "minor components"), in a total amount of 0.1 to 1.0%.

With respect to requirement (3A), the inclusion of the minor component(s) in a total amount of 0.1% or more improves the acid resistance of the glass. However, in the case where the content of the minor component(s) is too high, the homogeneity of the glass is lowered and the glass is prone to suffer phase separation. Consequently, the glass contains the minor component(s) in a total amount of 1.0% or less.

With respect to requirement (3A), the glass may contain only one of the minor components shown above or may contain two or more thereof. Furthermore, although the glass may contain any of the minor components shown above with regard to requirement (3A), it is preferable that the glass contains at least one oxide selected from the group consisting of $TiO_2$, $ZnO$, $Y_2O_3$, $ZrO_2$, and $La_2O_3$. It is more preferable that the glass contains at least one of $Y_2O_3$ and $ZrO_2$.

Preferred ranges of the contents of those minor components vary from component to component. For example, the content of $ZrO_2$ is preferably 0.25 to 1.0%, more preferably 0.3-1.0%. The content of $Y_2O_3$ is preferably 0.1 to 0.5%.

With respect to ZnO and $ZrO_2$ among those minor components, in the case where the glass contains only ZnO and/or $ZrO_2$ as the minor component(s), that is, in the case where the glass contains only ZnO, where the glass contains only $ZrO_2$, or where the glass contains only ZnO and $ZrO_2$, then the content thereof can be higher than 1.0% as shown in the following requirement (3B).

Requirement (3B): the glass substrate 2 contains at least one of ZnO and $ZrO_2$ in a total content of 1.5 to 4.0%.

With respect to requirement (3B), the inclusion of at least one of ZnO and $ZrO_2$ in a total content of 1.5% or more improves the acid resistance of the glass. However, in the case where the total content of ZnO and/or $ZrO_2$ is too high, the homogeneity of the glass is lowered and the glass is prone to suffer phase separation. Consequently, the glass contains ZnO and/or $ZrO_2$ in a total content of 4.0% or less.

With respect to requirement (3B), the glass may contain either ZnO or $ZrO_2$ only or may contain both.

It is preferable that the glass substrate 2 further satisfies requirement (4), from the standpoint of reducing the dielectric loss in a range of high frequencies exceeding 30 GHz.

Requirement (4): the glass substrate 2 includes alkali metal oxides in a total content of 0.001 to 5%, and out of the alkali metal oxides, a molar ratio of the contents represented by $Na_2O/(Na_2O+K_2O)$ is 0.01 to 0.99.

With respect to requirement (4), the dielectric loss of the glass substrate 2, which includes $SiO_2$ as a main component, can be reduced by regulating the content of alkali metal oxides in the glass substrate 2 to 5% or less. Meanwhile, by regulating the total content of alkali metal oxides therein to 0.001% or higher, not only practical glass meltability and practical efficiency of producing the glass substrate 2 are obtained without necessitating excess purification of raw materials, but also the thermal expansion coefficient of the glass substrate 2 can be regulated. Examples of the alkali metal oxides which can be contained in the glass substrate 2 include $Li_2O$, $Na_2O$, $K_2O$, $Rb_2O$, and $Cs_2O$, but $Na_2O$ and $K_2O$ are especially important. It is hence preferable that the total content of $Na_2O$ and $K_2O$ is in the range of 0.001 to 5%. The total content of alkali metal oxides is more preferably 3% or less, more preferably 2.5% or less, more preferably 2% or less, more preferably 1.5% or less, preferably 1% or less, more preferably 0.5% or less, more preferably 0.2% or less, more preferably 0.1% or less, particularly preferably 0.05% or less. The total content of alkali metal oxides is more preferably 0.002% or higher, even more preferably 0.003% or higher, especially preferably 0.005% or higher.

Furthermore, by causing $Na_2O$ and $K_2O$ to coexist in the glass substrate 2 including $SiO_2$ as a main component, in other words, by regulating the molar ratio of the contents represented by $Na_2O/(Na_2O+K_2O)$ to a value in the range of 0.01 to 0.99, the alkali components are inhibited from moving and, hence, the dielectric loss of the glass substrate 2 can be reduced. The molar ratio of the contents represented by $Na_2O/(Na_2O+K_2O)$ is more preferably 0.98 or less, even more preferably 0.95 or less, especially preferably 0.9 or less. The molar ratio represented by $Na_2O/(Na_2O+K_2O)$ is more preferably 0.02 or higher, more preferably 0.05 or higher, more preferably 0.1 or higher, more preferably 0.2 or higher, more preferably 0.3 or higher, more preferably 0.4 or higher, more preferably 0.5 or higher, more preferably 0.6 or higher, more preferably 0.7 or higher, more preferably 0.75 or higher, especially preferably 0.8 or higher.

The content of $SiO_2$, among the constituent components of the glass substrate 2, that is a main component and serves as a network-forming substance is preferably 40 to 75%. In the case where the content of $SiO_2$ is 40% or higher, satisfactory glass-forming ability and satisfactory weatherability can be obtained and devitrification can be inhibited. The content of $SiO_2$ is more preferably 45% or higher, even more preferably 50% or higher, especially preferably 55% or higher. Meanwhile, in the case where the content of $SiO_2$ is 75% or less, satisfactory glass meltability can be attained. The content of $SiO_2$ is more preferably 74% or less, even more preferably 73% or less, especially preferably 72% or less.

Besides each of the aforementioned components, the glass substrate 2 may contain $Fe_2O_3$ or $SnO_2$ as an optional component.

$Fe_2O_3$ is a component which controls the light-absorbing performance, e.g., infrared-absorbing performance and ultraviolet-absorbing performance, of the glass substrate 2, and can be contained according to need in such an amount that the content of Fe in terms of $Fe_2O_3$ is 0.12% or less. The content of Fe is preferably 0.12% or less because the dielectric loss of the glass substrate 2 can be reduced and an ultraviolet transmittance can be maintained. From the standpoint of improving the ultraviolet transmittance (e.g., transmittance at a wavelength of 300 nm or 350 nm), the content of Fe is more preferably 0.03% or less, more preferably 0.02% or less, more preferably 0.015% or less, more preferably 0.013% or less, more preferably 0.012% or less, more preferably 0.011% or less, more preferably 0.009% or less, more preferably 0.008% or less, more preferably 0.007% or less, more preferably 0.006% or less, more preferably 0.005% or less, more preferably 0.004% or less, especially preferably 0.002% or less. Heightening the ultraviolet transmittance of the glass substrate 2 enables ultraviolet-curable materials to be used in, for example, a layer superposition step among steps for producing high-frequency devices, thereby heightening the producibility of the high-frequency devices.

With respect to the term "ultraviolet" used in this description, words such as ultraviolet-absorbing ability, ultraviolet transmittance, and ultraviolet-shielding ability mean absorbing ability, transmittance, shielding ability, etc. with respect to light having a wavelength of, for example, 300 nm or 350 nm.

The glass substrate 2 may contain Fe according to need in such an amount that the content of Fe in terms of $Fe_2O_3$ is 0.005% or higher. Such Fe contents are preferred because the glass substrate 2 can have an enhanced ultraviolet-shielding ability. In the case where the glass is desired to have an enhanced ultraviolet-shielding ability, the content of Fe is more preferably 0.01% or higher, still more preferably 0.05% or higher. By enhancing the ultraviolet-shielding ability of the glass substrate 2, the glass substrate 2 can be made to function as a protective material in the case where a resin that can be deteriorated by ultraviolet rays is used as a member.

The wording "content of Fe in terms of $Fe_2O_3$" means the content of Fe which is present in the glass substrate and all of which is regarded as being in the form of $Fe_2O_3$.

$SnO_2$ can be contained in the glass because $SnO_2$ can be used as a refining agent in a refining step in the process for glass substrate production which will be described later. The content of a tin compound in the glass in terms of $SnO_2$ with respect to the whole glass matrix composition, which is taken as 100%, i.e. the Sn content in terms of $SnO_2$ is more preferably 0.25% or less, still more preferably 0.2% or less, especially preferably 0.15% or less.

The glass substrate 2 has a thermal expansion coefficient suitable for electronic devices, according to the contents of alkali metal oxides, alkaline-earth metal oxides, etc. Specifically, the average thermal expansion coefficient thereof within the range of 50° C. to 350° C. is 3 ppm/° C. to 15 ppm/° C. The glass substrate 2 having such a thermal expansion coefficient can be made to have a more properly regulated difference in thermal expansion coefficient between this glass substrate 2 and another member when used in configuring, for example, a semiconductor package as a high-frequency device.

Furthermore, the glass substrate 2 preferably has a Young's modulus of 40 GPa or higher. In the case where the glass substrate 2 having such a Young's modulus is caused to run in steps (wafer process) for producing a high-frequency device, the deflection amount can be reduced, thereby making it possible to inhibit the occurrence of high-frequency device production failures, etc. The Young's modulus of the glass substrate 2 is more preferably 50 GPa or higher, even more preferably 55 GPa or higher. The glass substrate 2 preferably has a porosity of 0.1% or less. Due to this, high-frequency devices produced using the glass substrate 2 can be inhibited from making noises, etc. The porosity of the glass substrate 2 is more preferably 0.01% or less, even more preferably 0.001% or less.

It is preferable that the glass substrate 2 has a transmittance at a wavelength of 600 nm of 60% or higher. In the case where the transmittance satisfies this requirement, the glass substrate has high glass homogeneity and is hence prevented from coming to have local irregularities in the substrate surface when pickled. Thus, the transmission loss of high-frequency signals can be reduced.

The transmittance of the glass substrate 2 at a wavelength of 600 nm is more preferably 70% or higher, still more preferably 75% or higher, yet still more preferably 80% or higher, especially preferably 85% or higher.

It is preferable that the glass substrate 2 has a haze of 35% or less. In the case where the haze of the glass substrate 2 is 35% or less, the glass substrate has high glass homogeneity and is hence prevented from coming to have local irregularities in the substrate surface when the glass substrate is pickled. Thus, the transmission loss of high-frequency signals can be reduced. The haze of the glass substrate 2 is more preferably 30% or less, still more preferably 20% or less, yet still more preferably 10% or less, especially preferably 5% or less, most preferably 1% or less.

The shape of the glass substrate 2 is not particularly limited. However, the thickness of the glass substrate 2 is preferably 0.05 mm to 1 mm, and one main surface of the glass substrate 2 preferably has an area of 225 $cm^2$ to 10,000 $cm^2$. In the case where the thickness of the glass substrate 2 is 1 mm or less, it is possible to attain thickness and size reductions in high-frequency devices, an improvement in the efficiency of producing high-frequency devices, etc. Furthermore, the glass substrate 2 can have an improved ultraviolet transmittance, making it possible to heighten the efficiency of device production by using an ultraviolet-curing material in device production steps. The thickness of the glass substrate 2 is more preferably 0.5 mm or less. Meanwhile, in the case where the thickness of the glass substrate 2 is 0.05 mm or larger, this glass substrate 2 can retain the strength, etc. when caused to run. In addition, this glass substrate 2 can have improved ultraviolet-shielding ability and can protect resins which can be deteriorated by ultraviolet light. The thickness of the glass substrate 2 is more preferably 0.1 mm or larger, even more preferably larger than 0.2 mm. Moreover, a glass substrate 2 according to an embodiment can be provided in a substrate size which has the thickness shown above and an area of 10,000 $cm^2$. It is hence possible to cope with a panel size increase, etc. The area of the glass substrate 2 is more preferably 3,600 $cm^2$ or less.

The glass substrate 2 preferably has a devitrification temperature of 1,400° C. or lower. In the case where the devitrification temperature thereof is 1,400° C. or lower, glass forming can be conducted using a forming apparatus in which the members have lowered set temperatures and can have a prolonged life. The devitrification temperature thereof is more preferably 1,350° C. or lower, even more preferably 1,330° C. or lower, especially preferably 1,300° C. or lower. The devitrification temperature of a glass is determined in the following manner. Crushed particles of the glass are placed on a platinum dish and subjected to heat treatment for 17 hours in an electric furnace controlled so as to have a constant temperature. The sample after the heat treatment is examined with an optical microscope to determine both a highest temperature at which crystal precipitation has occurred in the surface and inside of the glass and a lowest temperature at which crystal precipitation has occurred in neither the glass surface nor the inside thereof. The highest and lowest temperatures are averaged, and the average value is taken as the devitrification temperature.

It is preferable that the glass substrate 2 has a temperature $T_2$ of 1,700° C. or lower, the temperature $T_2$ being a temperature at which the glass has a viscosity of $10^2$ dPa·s. $T_2$ is a temperature which is an index to the meltability of the glass. The glass substrate 2 preferably has a $T_2$ of 1,700° C. or lower from the standpoint of melting the glass. The $T_2$ thereof is more preferably 1,690° C. or lower, still more preferably 1,680° C. or lower, especially preferably 1,670° C. or lower, most preferably 1,660° C. or lower.

The glass substrate 2 has excellent meltability because of the low $T_2$ temperature thereof. The glass substrate 2 has excellent formability in a float process because of the low devitrification temperature thereof.

Next, a process for producing a glass substrate according to an embodiment is explained. In the case of producing the glass substrate according to an embodiment, the glass substrate is produced through: a melting step in which raw materials for glass are heated to obtain a molten glass; a refining step in which bubbles are removed from the molten glass; a forming step in which the molten glass is formed into a sheet to obtain a glass ribbon; and an annealing step in which the glass ribbon is gradually cooled to a room-temperature state. Alternatively, use may be made of a method in which the molten glass is formed into a block, annealed, and then subjected to cutting and polishing to produce the glass substrate.

In the melting step, raw materials are prepared so as to result in a desired composition of the glass substrate, and the raw materials are continuously introduced into a melting furnace and heated to preferably about 1,450 to 1,750° C. to obtain a molten glass.

As the raw materials, use can be made of oxides, carbonates, nitrates, hydroxides, halides such as chlorides, and the like. In the case where the process includes a step in which the molten glass comes into contact with platinum as in the melting or refining step, fine platinum particles may come into the molten glass and be included as foreign matter in the glass substrate obtained. Use of nitrates as raw materials has the effect of preventing the inclusion of platinum as foreign matter.

Usable as the nitrates are strontium nitrate, barium nitrate, magnesium nitrate, calcium nitrate, and the like. More preferred is to use strontium nitrate. With respect to the particle size of the raw materials, use may be suitably made of raw materials ranging from raw materials having such a large particle diameter of several hundred micrometers that the particles do not remain unmelted to raw materials having such a small particle diameter of several micrometers that the particles neither fly off during raw-material conveyance nor aggregate into secondary particles. Use of granules is possible. The water content of the raw materials can be suitably regulated in order to prevent the raw materials from flying off. Melting conditions including β-OH and the degree of oxidation/reduction of Fe (redox $[Fe^{2+}/(Fe^{2+}+Fe^{3+})]$) can also be suitably regulated.

The subsequent refining step is a step in which bubbles are removed from the molten glass obtained in the melting step. In the refining step, a method of degassing under reduced pressure may be used, or degassing may be conducted by heating the molten glass to a temperature higher than the temperature used for melting the raw materials. In a step for producing a glass substrate according to an embodiment, $SO_3$ or $SnO_2$ can be used as a refining agent. Preferred $SO_3$ sources are the sulfates of at least one element selected from among Al, Na, K, Mg, Ca, Sr, and Ba. More preferred are the sulfates of the alkaline earth metals. Preferred of these are $CaSO_4 \cdot 2H_2O$, $SrSO_4$, and $BaSO_4$, because these sulfates are highly effective in enlarging bubbles.

As a refining agent for the method for degassing performed under reduced pressure, it is preferred to use a halogen such as Cl or F. Preferred Cl sources are the chlorides of at least one element selected from among Al, Mg, Ca, Sr, and Ba. More preferred are the chlorides of the alkaline earth metals. Especially preferred of these are $SrCl_2 \cdot 6H_2O$ and $BaCl_2 \cdot 2H_2O$, because these chlorides are highly effective in enlarging bubbles and have low deliquescence. Preferred F sources are the fluorides of at least one element selected from among Al, Na, K, Mg, Ca, Sr, and Ba. More preferred are the fluorides of the alkaline earth metals. Even more preferred of these is $CaF_2$, because this fluoride is highly effective in enhancing the meltability of raw glass materials.

Tin compounds represented by $SnO_2$ evolve $O_2$ gas in molten glasses. In molten glasses, $SnO_2$ at a temperature of 1,450° C. or higher has the function of being reduced to SnO to evolve $O_2$ gas, thereby enlarging the bubbles. In producing the glass substrate 2 according to an embodiment, the raw glass materials are melted by heating to about 1,450 to 1,750° C. and, hence, the bubbles in the molten glass are more effectively enlarged. In the case of using $SnO_2$ as a refining agent, the raw materials are preferably prepared so that tin compounds are contained in an amount of 0.01% or larger in terms of $SnO_2$ based on the whole glass matrix composition, which is taken as 100%. In the case where the content of $SnO_2$ is 0.01% or higher, the refining function is obtained in melting the raw glass materials. The content of $SnO_2$ is more preferably 0.05% or higher, even more preferably 0.10% or higher. The content of $SnO_2$ is preferably 0.3% or less because the glass is inhibited from being colored or devitrified. The content of tin compounds in the glass is more preferably 0.25% or less, even more preferably 0.2% or less, especially preferably 0.15% or less, in terms of $SnO_2$ based on the whole glass matrix composition, which is taken as 100%.

The subsequent forming step is a step in which the molten glass from which bubbles have been removed in the refining step is formed into a sheet shape to obtain a glass ribbon. In the forming step, a common technique for forming a glass into a sheet shape can be used, such as, for example, the float process, in which a molten glass is poured onto a molten metal, e.g., tin, to obtain a sheet-shaped glass ribbon, an overflow downdraw process (fusion process) in which a molten glass is caused to flow downward from a trough member, or a slit downdraw process in which a molten glass is caused to flow down through a slit.

Next, the annealing step is a step in which the glass ribbon obtained in the forming step is cooled to a room-temperature state under controlled cooling conditions. In the annealing step, the glass ribbon is cooled so as to be the glass ribbon and then further cooled gradually to a room-temperature state under given conditions. The annealed glass ribbon is cut to obtain a glass substrate.

In the case where the cooling rate R in the annealing step is too high, the cooled glass is prone to have a residual strain. In addition, the equivalent cooling rate, which is a parameter that reflects a fictive temperature, becomes too high. As a result, the dielectric loss cannot be reduced. It is hence preferred to set the R so as to result in an equivalent cooling rate of 800° C./min or less. The equivalent cooling rate is more preferably 400° C./min or less, even more preferably 100° C./min or less, especially preferably 50° C./min or less. Meanwhile, in the case where the cooling rate is too low, the step requires too long a time period, resulting in a decrease in production efficiency. It is hence preferred to set the cooling rate at 0.1° C./min or higher. The cooling rate is more preferably 0.5° C./min or higher, even more preferably 1° C./min or higher.

A definition of the equivalent cooling rate and a method for evaluation thereof are as follows. A glass having a composition to be examined and having been processed into a rectangular parallelepiped of 10 mm×10 mm×0.3-2.0 mm is held at [strain point+1700° C.] for 5 minutes using an infrared-heating electric furnace and then cooled to room temperature (25° C.). This operation is conducted to produce a plurality of glass samples by performing the cooling at various cooling rates ranging from 1 to 1,000° C./min.

A precision refractometer (e.g., KPR2000, manufactured by Shimadzu Device Corp.) is used to measure the refractive index $n_d$ for d-line (wavelength, 587.6 nm) of each of the plurality of glass samples. For the measurement, use may be made of a V-block method or a minimum deviation method. The obtained values of $n_d$ are plotted against the logarithm of the cooling rates, thereby obtaining a calibration curve regarding a relationship between $n_d$ and cooling rate.

Next, a glass having the same composition and actually produced through the steps of melting, forming, cooling, etc. is examined for $n_d$ by the measuring method shown above. A cooling rate corresponding to the $n_d$ obtained (the cooling rate being referred to as equivalent cooling rate in this embodiment) is determined from the calibration curve.

The present invention is not limited to the embodiments described above. Modifications, improvements, and the like made within the range where the objects of the present invention can be achieved are permitted. For example, in the case of producing a glass substrate according to the present invention, a plate-shaped glass may be obtained by press forming, in which a molten glass is directly formed into a plate shape.

Furthermore, for producing a glass substrate according to the present invention, a crucible made of platinum or of an alloy including platinum as a main component (hereinafter referred to as a platinum crucible) may be used as a melting vessel or a refining vessel, besides the production process in which a melting vessel made of a refractory is used. In the case of using a platinum crucible, a melting step may be performed in the following manner. Raw materials are prepared so as to result in the composition of the glass substrate to be obtained, and the platinum crucible containing the raw materials is heated in an electric furnace to preferably about 1,450 to 1,750° C. A platinum stirrer is inserted thereinto to stir the contents for 1 to 3 hours, thereby obtaining a molten glass.

In a forming step among steps for glass substrate production with the platinum crucible, the molten glass is poured out, for example, onto a carbon plate or into a casting mold to form the molten glass into a plate or block shape. In an annealing step, the formed glass is held at a temperature of typically about Tg+50° C., subsequently cooled to around the strain point at a rate of about 1 to 10° C./min, and then cooled to a room-temperature state at such a cooling rate that no strain remains. The cooled glass is cut into a given shape and polished to obtain a glass substrate. The glass substrate obtained by the cutting may be heated, for example, to a temperature of about Tg+50° C. and then gradually cooled to a room-temperature state at a given cooling rate. Thus, the equivalent cooling temperature of the glass can be regulated.

The circuit board 1 employing the above-described glass substrate 2 according to an embodiment is suitable for use in high-frequency devices in which high-frequency signals, in particular, high-frequency signals having a frequency exceeding 30 GHz and even high-frequency signals of 35 GHz or higher, are processed. This circuit board 1 can reduce the transmission loss of such high-frequency signals to improve the quality, intensity, and other properties of the high-frequency signals. The glass substrate 2 and the circuit board 1 according to an embodiment are suitable for high-frequency devices (electronic devices) such as semiconductor devices for use in communication appliances, such as, for example, cell phones, smartphones, personal digital assistants, and Wi-Fi appliances, and for surface acoustic wave (SAW) devices, radar components such as radar transceivers, antenna components such as liquid-crystal antennas, etc.

EXAMPLES

The present invention is explained below in detail by reference to Examples, but the present invention is not limited to the following Examples. Examples 1 to 18 are examples according to the present invention, and Examples 19 to 24 are comparative examples.

Examples 1 to 24

Glass substrates respectively having the compositions (the contents are given in terms of mol % on an oxide basis) shown in Tables 1 to 5 and each having a thickness of 1.0 mm, a shape of 50×50 mm, and an arithmetic average roughness Ra of the main surfaces of 1.0 nm were prepared. The glass substrates were produced by a melting method using a platinum crucible. Raw materials including silica sand were mixed so as to obtain glasses having the compositions shown in Tables 1 to 5, thereby producing 1-kg batches. The raw materials of each batch were placed in the platinum crucible and melted by heating at a temperature of 1,650° C. in an electric furnace for 3 hours, thereby obtaining a molten glass. In the melting, a platinum stirrer was inserted into the platinum crucible and the contents were stirred for 1 hour to homogenize the glass. The molten glass was poured out onto a carbon plate and formed into a plate shape. Thereafter, the plate-shaped glass was introduced into an electric furnace having a temperature of about Tg+50° C. and held therein for 1 hour. Subsequently, the electric furnace was cooled to Tg−100° C. at a cooling rate of 1° C./min and then allowed to cool until the glass cooled to room temperature. Thereafter, the glass was cut and polished into a plate shape.

In Table 1, "Total RO" means the sum of MgO, CaO, SrO, and BaO, as the total content of alkaline-earth metal oxides, and "Total $R_2O$" means the sum of $Na_2O$ and $K_2O$, as the total content of alkali metal oxides.

Tables 6 to 10 show the following properties of the glass substrates of Examples 1 to 24: Young's modulus, average thermal expansion coefficient within the 50-350° C. range, values of relative permittivity at 10 GHz and 35 GHz and ratio therebetween, values of dielectric dissipation factor at 10 GHz and 35 GHz and ratio therebetween, density, specific modulus, $T_2$, devitrification temperature, acid resistance, haze, and transmittance at 600-nm wavelength. Haze and transmittance at 600-nm wavelength are indexes to glass homogeneity.

Methods for determining the properties are shown below.
(Young's Modulus)

A glass having a thickness of 0.5 to 10 mm was examined for Young's modulus by an ultrasonic pulse method in accordance with JIS Z2280 (year 1993). The unit is GPa.
(Average Thermal Expansion Coefficient)

A differential thermodilatometer was used to make a measurement in accordance with the method as provided for in JIS R3102 (year 1995). The measurement was made over the temperature range of 50 to 350° C. The unit is ppm/° C.
(Relative Permittivity, Dielectric Dissipation Factor)

A cavity resonator and a vector network analyzer were used to make a measurement in accordance with the method as provided for in JIS R1641 (year 2007). The measuring frequency was 10 GHz or 35 GHZ, which was the air resonance frequency for the cavity resonator.
(Density)

Glass masses weighing about 20 g and containing no bubbles were examined for density by Archimedes' method. The unit is $g/cm^3$.
(Specific Modulus)

Specific modulus was determined by a calculation from the determined density and Young's modulus. The unit is $GPa \cdot cm^3/g$.
($T_2$)

A glass was examined for viscosity with a rotational viscometer to determine a temperature $T_2$ (unit: ° C.) at which the glass had a viscosity of $10^2$ dPa·s.
(Devitrification Temperature)

Crushed particles of a glass were placed on a platinum dish and heat-treated for 17 hours in an electric furnace regulated so as to have a given constant temperature in the range of 1,100 to 1,400° C. The heat-treated sample was examined with an optical microscope. The highest temperature at which crystal precipitation occurred inside the glass and the lowest temperature at which no crystal precipitation occurred inside the glass were averaged. The average value was taken as the devitrification temperature.
(Acid Resistance)

A glass sample was immersed in an aqueous acid solution (6 wt % $HNO_3$+5 wt % $H_2SO_4$; 45° C.) for 170 seconds to evaluate the glass sample for the amount of glass components which were dissolved away per unit surface area ($mg/cm^2$). In the case where the amount of glass components which had been dissolved away was 0.02 $mg/cm^2$ or less, the glass had satisfactory acid resistance.

(Haze)

A haze meter (Type: HZ-V3 Hazemeter, manufactured by Suga Test Instruments Co., Ltd.) was used to measure the haze of a glass. As the glass to be evaluated, use was made of a glass plate which had a thickness of 1.0 mm and in which both surfaces had been mirror-polished. Glasses having a haze of 35% or less were regarded as acceptable.

(Transmittance)

A visible/ultraviolet spectrophotometer (Type: U-4100 Spectrophotometer, manufactured by Hitachi Ltd.) was used to examine a glass for transmittance at a wavelength of 600 nm. The transmittance is expressed as external transmittance including a loss due to reflection. As the glass to be evaluated, use was made of a glass plate which had a thickness of 1.0 mm and in which both surfaces had been mirror-polished. Glasses having a transmittance at 600-nm wavelength of 60% or higher were regarded as acceptable.

TABLE 1

|  | Example 1 | Example 2 | Example 3 | Example 4 | Example 5 |
|---|---|---|---|---|---|
| $SiO_2$ | 62.0 | 62.0 | 62.0 | 62.0 | 62.0 |
| $Al_2O_3$ | 8.0 | 7.7 | 7.7 | 7.7 | 7.7 |
| $B_2O_3$ | 23.0 | 23.0 | 23.0 | 23.0 | 23.0 |
| $Al_2O_3 + B_2O_3$ | 31.0 | 30.7 | 30.7 | 30.7 | 30.7 |
| MgO | 2.0 | 4.0 | 4.0 | 4.0 | 4.0 |
| CaO | 3.0 | 2.0 | 2.0 | 2.0 | 2.0 |
| SrO | 1.0 | 0.8 | 0.8 | 0.8 | 0.8 |
| BaO | — | 0.2 | 0.2 | 0.2 | 0.2 |
| Total RO | 6.0 | 7.0 | 7.0 | 7.0 | 7.0 |
| $Na_2O$ | 0.012 | 0.006 | 0.01 | 0.01 | 0.015 |
| $K_2O$ | 0.003 | 0.003 | 0.005 | 0.003 | 0.004 |
| Total $R_2O$ | 0.015 | 0.009 | 0.015 | 0.013 | 0.019 |
| $Fe_2O_3$ | 0.01 | 0.01 | 0.01 | 0.01 | 0.01 |
| $SnO_2$ | — | — | — | — | — |
| ZnO | — | — | — | — | — |
| $ZrO_2$ | 1.0 | 0.3 | 0.1 | — | — |
| $Y_2O_3$ | — | — | 0.1 | — | 0.3 |
| $TiO_2$ | — | — | 0.1 | 0.3 | — |
| $La_2O_3$ | — | — | — | — | — |
| $Al_2O_3/(Al_2O_3 + B_2O_3)$ | 0.26 | 0.25 | 0.25 | 0.25 | 0.25 |
| $Na_2O/(Na_2O + K_2O)$ | 0.80 | 0.67 | 0.67 | 0.77 | 0.79 |

TABLE 2

|  | Example 6 | Example 7 | Example 8 | Example 9 | Example 10 |
|---|---|---|---|---|---|
| $SiO_2$ | 61.7 | 62.5 | 62.5 | 63.0 | 62.0 |
| $Al_2O_3$ | 7.7 | 7.7 | 7.7 | 7.7 | 8.0 |
| $B_2O_3$ | 23.0 | 22.5 | 22.5 | 22.0 | 23.0 |
| $Al_2O_3 + B_2O_3$ | 30.7 | 30.2 | 30.2 | 29.7 | 31.0 |
| MgO | 4.0 | 4.0 | 4.0 | 4.0 | 1.0 |
| CaO | 2.0 | 2.0 | 2.0 | 2.0 | 2.0 |
| SrO | 0.8 | 0.8 | 0.8 | 0.8 | 1.0 |
| BaO | 0.2 | 0.2 | 0.2 | 0.2 | — |
| Total RO | 7.0 | 7.0 | 7.0 | 7.0 | 4.0 |
| $Na_2O$ | 0.02 | 0.015 | 0.015 | 0.015 | 0.012 |
| $K_2O$ | 0.004 | 0.005 | 0.006 | 0.008 | 0.003 |
| Total $R_2O$ | 0.024 | 0.02 | 0.021 | 0.023 | 0.015 |
| $Fe_2O_3$ | 0.01 | 0.01 | 0.01 | 0.01 | 0.01 |
| $SnO_2$ | 0.3 | — | — | — | — |
| ZnO | — | — | — | — | 3.0 |
| $ZrO_2$ | — | — | — | — | — |
| $Y_2O_3$ | 0.3 | 0.3 | 0.3 | 0.3 | — |
| $TiO_2$ | — | — | — | — | — |
| $La_2O_3$ | — | — | — | — | — |
| $Al_2O_3/(Al_2O_3 + B_2O_3)$ | 0.25 | 0.25 | 0.26 | 0.26 | 0.26 |
| $Na_2O/(Na_2O + K_2O)$ | 0.83 | 0.75 | 0.71 | 0.65 | 0.80 |

TABLE 3

|  | Example 11 | Example 12 | Example 13 | Example 14 | Example 15 |
|---|---|---|---|---|---|
| $SiO_2$ | 62.0 | 62.0 | 62.0 | 62.0 | 62.0 |
| $Al_2O_3$ | 8.0 | 8.0 | 7.4 | 7.1 | 7.7 |
| $B_2O_3$ | 23.0 | 23.0 | 23.0 | 23.0 | 23.0 |
| $Al_2O_3 + B_2O_3$ | 31.0 | 31.0 | 30.4 | 30.1 | 30.7 |
| MgO | 1.0 | 2.0 | 4.0 | 4.0 | 4.0 |
| CaO | 2.0 | 3.0 | 2.0 | 2.0 | 2.0 |
| SrO | 1.0 | 1.5 | 0.8 | 0.8 | 0.8 |
| BaO | — | — | 0.2 | 0.2 | 0.2 |
| Total RO | 4.0 | 6.5 | 7.0 | 7.0 | 7.0 |
| $Na_2O$ | 0.009 | 0.01 | 0.012 | 0.012 | 0.012 |
| $K_2O$ | 0.003 | 0.003 | 0.004 | 0.006 | 0.004 |
| Total $R_2O$ | 0.012 | 0.013 | 0.016 | 0.018 | 0.016 |
| $Fe_2O_3$ | — | 0.01 | 0.01 | 0.01 | 0.01 |
| $SnO_2$ | — | — | — | — | — |
| ZnO | — | — | — | — | 0.1 |
| $ZrO_2$ | 3.0 | — | — | — | — |
| $Y_2O_3$ | — | — | 0.6 | 0.9 | 0.2 |
| $TiO_2$ | — | 0.5 | — | — | — |
| $La_2O_3$ | — | — | — | — | — |
| $Al_2O_3/(Al_2O_3 + B_2O_3)$ | 0.26 | 0.26 | 0.24 | 0.24 | 0.25 |
| $Na_2O/(Na_2O + K_2O)$ | 0.75 | 0.77 | 0.75 | 0.67 | 0.75 |

TABLE 4

|  | Example 16 | Example 17 | Example 18 |
|---|---|---|---|
| $SiO_2$ | 62.0 | 62.0 | 62.0 |
| $Al_2O_3$ | 7.7 | 7.6 | 7.5 |
| $B_2O_3$ | 23.0 | 23.0 | 23.0 |
| $Al_2O_3 + B_2O_3$ | 30.7 | 30.6 | 30.5 |
| MgO | 4.0 | 4.0 | 4.0 |
| CaO | 2.0 | 2.0 | 2.0 |
| SrO | 0.8 | 0.8 | 0.8 |
| BaO | 0.2 | 0.2 | 0.2 |
| Total RO | 7.0 | 7.0 | 7.0 |
| $Na_2O$ | 0.015 | 0.02 | 0.025 |
| $K_2O$ | 0.004 | 0.004 | 0.004 |
| Total $R_2O$ | 0.019 | 0.024 | 0.029 |
| $Fe_2O_3$ | 0.01 | 0.01 | 0.01 |
| $SnO_2$ | — | — | — |
| ZnO | 0.2 | 0.1 | 0.2 |
| $ZrO_2$ | — | — | — |
| $Y_2O_3$ | 0.1 | 0.3 | 0.3 |
| $TiO_2$ | — | — | — |
| $La_2O_3$ | — | — | — |
| $Al_2O_3/(Al_2O_3 + B_2O_3)$ | 0.25 | 0.25 | 0.25 |
| $Na_2O/(Na_2O + K_2O)$ | 0.79 | 0.83 | 0.86 |

TABLE 5

|  | Example 19 | Example 20 | Example 21 | Example 22 | Example 23 | Example 24 |
|---|---|---|---|---|---|---|
| $SiO_2$ | 62.0 | 60.0 | 66.1 | 62.0 | 62.0 | 62.0 |
| $Al_2O_3$ | 8.0 | 8.0 | 11.3 | 6.8 | 6.8 | 8.0 |
| $B_2O_3$ | 23.0 | 25.0 | 7.8 | 23.0 | 23.0 | 23.0 |
| $Al_2O_3 + B_2O_3$ | 31.0 | 33.0 | 19.1 | 29.8 | 29.8 | 31.0 |
| MgO | 4.0 | 2.0 | 5.1 | 4.0 | 4.0 | 1.0 |
| CaO | 2.0 | 3.0 | 4.5 | 2.0 | 2.0 | 1.0 |
| SrO | 0.8 | 2.0 | 5.2 | 0.8 | 0.8 | — |
| BaO | 0.2 | — | — | 0.2 | 0.2 | — |
| Total RO | 7.0 | 7.0 | 14.8 | 7.0 | 7.0 | 2.0 |
| $Na_2O$ | 0.01 | 0.005 | 0.07 | 0.009 | 0.005 | 0.005 |
| $K_2O$ | 0.005 | 0.001 | 0.01 | 0.003 | 0.003 | 0.003 |
| Total $R_2O$ | 0.015 | 0.006 | 0.08 | 0.012 | 0.008 | 0.008 |
| $Fe_2O_3$ | 0.01 | 0.008 | 0.003 | 0.01 | 0.01 | 0.01 |
| $SnO_2$ | — | — | — | — | — | — |
| ZnO | — | — | — | — | — | 3.0 |
| $ZrO_2$ | — | — | — | — | — | 2.0 |
| $Y_2O_3$ | — | — | — | 1.2 | 0.6 | — |
| $TiO_2$ | — | — | — | — | 0.6 | — |
| $La_2O_3$ | — | — | — | — | — | — |
| $Al_2O_3/(Al_2O_3 + B_2O_3)$ | 0.26 | 0.24 | 0.59 | 0.23 | 0.23 | 0.26 |
| $Na_2O/(Na_2O + K_2O)$ | 0.67 | 0.83 | 0.88 | 0.75 | 0.63 | 0.63 |

TABLE 6

|  | Example 1 | Example 2 | Example 3 | Example 4 | Example 5 |
|---|---|---|---|---|---|
| Young's modulus [GPa] | 59 | 59 | 59 | 58 | 59 |
| Average thermal expansion coefficient [ppm/° C.] | 3.0 | 3.3 | 3.3 | 3.3 | 3.3 |
| Relative permittivity at 10 GHz | 4.44 | 4.33 | 4.36 | 4.36 | 4.45 |
| Relative permittivity at 35 GHz | 4.44 | 4.36 | 4.39 | 4.39 | 4.48 |
| Dielectric dissipation factor at 10 GHz ($\times 10^{-3}$) | 1.84 | 1.80 | 1.90 | 1.80 | 1.90 |
| Dielectric dissipation factor at 35 GHz ($\times 10^{-3}$) | 2.76 | 2.48 | 2.62 | 2.48 | 2.62 |
| (Relative permittivity at 35 GHz)/(relative permittivity at 10 GHz) | 1.00 | 1.01 | 1.01 | 1.01 | 1.01 |
| (Dielectric dissipation factor at 35 GHz)/(dielectric dissipation factor at 10 GHz) | 1.50 | 1.38 | 1.38 | 1.38 | 1.38 |
| Density [g/cm$^3$] | 2.96 | 2.26 | 2.26 | 2.25 | 2.27 |
| Specific modulus [GPa · cm$^3$/g] | 20 | 26 | 26 | 26 | 26 |
| $T_2$ (Tlog$\eta$ = 2) (° C.) | 1639 | 1639 | 1639 | 1639 | 1643 |
| Devitrification temperature [° C.] | >1400 | 1180 | 1280 | 1280 | 1220 |
| Acid resistance [mg/cm$^2$] ($HNO_3 + H_2SO_4$, 45° C.) | 0.013 | 0.015 | 0.010 | 0.013 | 0.009 |
| Haze [%] (1.0-mm thick) | <0.5 | <0.5 | <0.5 | <0.5 | <0.5 |
| Transmittance [%] ($\lambda$ = 600 nm; 1.0-mm thick) | 90 | 90 | 90 | 90 | 90 |

TABLE 7

|  | Example 6 | Example 7 | Example 8 | Example 9 | Example 10 |
|---|---|---|---|---|---|
| Young's modulus [GPa] | 59 | 59 | 60 | 60 | 59 |
| Average thermal expansion coefficient [ppm/° C.] | 3.3 | 3.2 | 3.2 | 3.3 | 3.2 |
| Relative permittivity at 10 GHz | 4.45 | 4.35 | 4.37 | 4.35 | 4.38 |
| Relative permittivity at 35 GHz | 4.48 | 4.36 | 4.38 | 4.37 | 4.41 |
| Dielectric dissipation factor at 10 GHz ($\times 10^{-3}$) | 1.90 | 2.10 | 2.10 | 2.13 | 1.86 |
| Dielectric dissipation factor at 35 GHz ($\times 10^{-3}$) | 2.62 | 2.97 | 2.97 | 3.00 | 3.02 |

TABLE 7-continued

|  | Example 6 | Example 7 | Example 8 | Example 9 | Example 10 |
|---|---|---|---|---|---|
| (Relative permittivity at 35 GHz)/(relative permittivity at 10 GHz) | 1.01 | 1.00 | 1.00 | 1.00 | 1.01 |
| (Dielectric dissipation factor at 35 GHz)/(dielectric dissipation factor at 10 GHz) | 1.38 | 1.42 | 1.41 | 1.41 | 1.62 |
| Density [g/cm$^3$] | 2.27 | 2.27 | 2.27 | 2.27 | 2.30 |
| Specific modulus [GPa · cm$^3$/g] | 26 | 26 | 26 | 26 | 26 |
| $T_2$ (Tlog$\eta$ = 2) (° C.) | 1643 | 1648 | 1660 | 1657 | 1638 |
| Devitrification temperature [° C.] | 1220 | 1220 | 1220 | 1220 | 1300 |
| Acid resistance [mg/cm$^2$] (HNO$_3$ + H$_2$SO$_4$, 45° C.) | 0.011 | 0.002 | 0.002 | 0.002 | 0.012 |
| Haze [%] (1.0-mm thick) | <0.5 | <0.5 | <0.5 | <0.5 | <0.5 |
| Transmittance [%] ($\lambda$ = 600 nm; 1.0-mm thick) | 90 | 90 | 90 | 90 | 90 |

TABLE 8

|  | Example 11 | Example 12 | Example 13 | Example 14 | Example 15 |
|---|---|---|---|---|---|
| Young's modulus [GPa] | 59 | 59 | 59 | 60 | 60 |
| Average thermal expansion coefficient [ppm/° C.] | 3.2 | 3.2 | 3.2 | 3.4 | 3.4 |
| Relative permittivity at 10 GHz | 4.47 | 4.23 | 4.34 | 4.26 | 4.44 |
| Relative permittivity at 35 GHz | 4.48 | 4.23 | 4.34 | 4.26 | 4.47 |
| Dielectric dissipation factor at 10 GHz (×10$^{-3}$) | 1.71 | 2.01 | 2.01 | 2.01 | 1.85 |
| Dielectric dissipation factor at 35 GHz (×10$^{-3}$) | 2.42 | 2.83 | 2.83 | 2.83 | 2.55 |
| (Relative permittivity at 35 GHz)/(relative permittivity at 10 GHz) | 1.00 | 1.00 | 1.00 | 1.00 | 1.01 |
| (Dielectric dissipation factor at 35 GHz)/(dielectric dissipation factor at 10 GHz) | 1.42 | 1.40 | 1.40 | 1.40 | 1.38 |
| Density [g/cm$^3$] | 2.35 | 2.33 | 2.29 | 2.34 | 2.27 |
| Specific modulus [GPa · cm$^3$/g] | 25 | 25 | 26 | 26 | 26 |
| $T_2$ (Tlog$\eta$ = 2) (° C.) | 1638 | 1640 | 1639 | 1639 | 1639 |
| Devitrification temperature [° C.] | >1400 | >1400 | 1300 | 1350 | 1220 |
| Acid resistance [mg/cm$^2$] (HNO$_3$ + H$_2$SO$_4$, 45° C.) | 0.001 | 0.018 | 0.016 | 0.02 | 0.01 |
| Haze [%] (1.0-mm thick) | <0.5 | <0.5 | 0.79 | 29.0 | <0.5 |
| Transmittance [%] ($\lambda$ = 600 nm; 1.0-mm thick) | 90 | 90 | 90 | 64 | 90 |

TABLE 9

|  | Example 16 | Example 17 | Example 18 |
|---|---|---|---|
| Young's modulus [GPa] | 58 | 59 | 60 |
| Average thermal expansion coefficient [ppm/° C.] | 3.4 | 3.3 | 3.3 |
| Relative permittivity at 10 GHz | 4.42 | 4.45 | 4.45 |
| Relative permittivity at 35 GHz | 4.45 | 4.48 | 4.48 |
| Dielectric dissipation factor at 10 GHz (×10$^{-3}$) | 1.86 | 1.89 | 1.91 |
| Dielectric dissipation factor at 35 GHz (×10$^{-3}$) | 2.57 | 2.61 | 2.64 |
| (Relative permittivity at 35 GHz)/(relative permittivity at 10 GHz) | 1.01 | 1.01 | 1.01 |
| (Dielectric dissipation factor at 35 GHz)/(dielectric dissipation factor at 10 GHz) | 1.38 | 1.38 | 1.38 |
| Density [g/cm$^3$] | 2.26 | 2.27 | 2.27 |
| Specific modulus [GPa · cm$^3$/g] | 26 | 26 | 26 |
| $T_2$ (Tlog$\eta$ = 2) (° C.) | 1639 | 1639 | 1639 |
| Devitrification temperature [° C.] | 1260 | 1260 | 1280 |
| Acid resistance [mg/cm$^2$] (HNO$_3$ + H$_2$SO$_4$, 45° C.) | 0.014 | 0.012 | 0.010 |
| Haze [%] (1.0-mm thick) | <0.5 | <0.5 | <0.5 |
| Transmittance [%] ($\lambda$ = 600 nm; 1.0-mm thick) | 90 | 90 | 90 |

TABLE 10

| | Example 19 | Example 20 | Example 21 | Example 22 | Example 23 | Example 24 |
|---|---|---|---|---|---|---|
| Young's modulus [GPa] | 59 | 57 | 76 | 57 | 57 | 59 |
| Average thermal expansion coefficient [ppm/° C.] | 3.2 | 3.1 | 3.8 | 2.2 | 2.2 | 3.2 |
| Relative permittivity at 10 GHz | 4.36 | 4.44 | 5.49 | 4.26 | 4.26 | 4.44 |
| Relative permittivity at 35 GHz | 4.35 | 4.46 | 5.41 | 4.28 | 4.28 | 4.41 |
| Dielectric dissipation factor at 10 GHz ($\times 10^{-3}$) | 1.8 | 1.81 | 6.20 | 2.01 | 2.01 | 0.00 |
| Dielectric dissipation factor at 35 GHz ($\times 10^{-3}$) | 2.61 | 2.76 | 8.98 | 2.83 | 2.83 | 0.00 |
| (Relative permittivity at 35 GHz)/(relative permittivity at 10 GHz) | 1.00 | 1.00 | 0.99 | 1.00 | 1.00 | 0.99 |
| (Dielectric dissipation factor at 35 GHz)/(dielectric dissipation factor at 10 GHz) | 1.45 | 1.53 | 1.45 | 1.40 | 1.40 | 1.43 |
| Density [g/cm$^3$] | 2.26 | 2.27 | 2.50 | 2.23 | 2.23 | 2.30 |
| Specific modulus [GPa · cm$^3$/g] | 26 | 25 | 30 | 26 | 26 | 26 |
| $T_2$ (Tlog$\eta$ = 2) (° C.) | 1626 | 1611 | 1645 | 1639 | 1639 | 1635 |
| Devitrification temperature [° C.] | 1220 | 1160 | 1270 | >1400 | >1400 | 1350 |
| Acid resistance [mg/cm$^2$] (HNO$_3$ + H$_2$SO$_4$, 45° C.) | 0.027 | 0.038 | 0.002 | 0.027 | 0.030 | 0.003 |
| Haze [%] (1.0-mm thick) | <0.5 | <0.5 | <0.5 | 81.3 | 56.4 | 61.6 |
| Transmittance [%] ($\lambda$ = 600 nm; 1.0-mm thick) | 90 | 90 | 90 | 3 | 30 | 33 |

The glass substrates of the Examples according to the present invention (Examples 1 to 18) each had a dielectric dissipation factor at 35 GHz of 0.007 or less and were satisfactory in terms of acid resistance and of haze and transmittance at a wavelength of 600 nm, which are indexes to glass homogeneity. Examples 19 and 20, which contained no minor components, had poor acid resistance. Example 21 contained no minor components and had an Al$_2$O$_3$/(Al$_2$O$_3$+B$_2$O$_3$) molar ratio larger than 0.45 and a low B$_2$O$_3$ content. Example 21 hence had a dielectric dissipation factor at 35 GHz of larger than 0.007 and was unable to be reduced in dielectric loss in a high-frequency range. Examples 22 and 23, in each of which the total content of minor components according to requirement (3A) was higher than 1.0%, had poor acid resistance and were poor in both haze and transmittance, which are indexes to glass homogeneity. Examples 24, in which the total content of ZnO and ZrO$_2$ according to requirement (3B) was higher than 4.0%, was poor in both haze and transmittance at a wavelength of 600 nm, which are indexes to glass homogeneity, although having satisfactory acid resistance.

While the invention has been described in detail and with reference to specific embodiments thereof, it will be apparent to one skilled in the art that various changes and modifications can be made therein without departing from the spirit and scope thereof. This application is based on Japanese patent application No. 2018-213526 filed on Nov. 14, 2018, the contents thereof being incorporated herein by reference.

INDUSTRIAL APPLICABILITY

The glass substrate for high-frequency devices of the present invention can reduce a dielectric loss of high-frequency signals. This glass substrate is useful in all kinds of high-frequency electronic devices which handle high-frequency signals such as signals with frequencies of 10 GHz and higher, in particular, high-frequency signals with frequencies exceeding 30 GHz, in particular, frequencies of 35 GHz and higher, for example, as glass substrates for communication appliances, frequency filter components for SAW devices, FBARs, etc., components for band-pass filters for waveguides, etc., components for SIWs (substrate integrated waveguides), components for radars, components for antennas (in particular, liquid-crystal antennas, which are regarded as optimal for satellite communication), etc.

REFERENCE SIGNS LIST

1: Circuit board
2: Glass substrate
2a, 2b: Main surface
3, 4: Wiring layer

The invention claimed is:
1. A glass substrate, comprising, in terms of molar percentage based on oxides:
   40 to 75% SiO$_2$;
   1 to 30% B$_2$O$_3$;
   0 to 15% Al$_2$O$_3$;
   0.1 to 13% of one or more alkaline-earth metal oxides selected from the group consisting of MgO, CaO, SrO, and BaO;
   0.1 to 1.0% of at least one oxide selected from the group consisting of Sc$_2$O$_3$, TiO$_2$, ZnO, Ga$_2$O$_3$, GeO$_2$, Y$_2$O$_3$, ZrO$_2$, Nb$_2$O$_5$, In$_2$O$_3$, TeO$_2$, HfO$_2$, Ta$_2$O$_5$, WO$_3$, Bi$_2$O$_3$, La$_2$O$_3$, Gd$_2$O$_3$, Yb$_2$O$_3$, and Lu$_2$O$_3$;
   0.1 to 0.5% Y$_2$O$_3$; and
   0.001 to 5% Na$_2$O and K$_2$O;
   wherein
   a molar ratio represented by Al$_2$O$_3$/(Al$_2$O$_3$+B$_2$O$_3$) is 0 to 0.45,
   a molar ratio represented by Na$_2$O/(Na$_2$O+K$_2$O) is 0.01 to 0.99, and
   the glass substrate has a dielectric dissipation factor at 35 GHz of 0.007 or less.
2. The glass substrate according to claim 1, further comprising ZrO$_2$ in an amount of 0.25 to 1.0% in terms of molar percentage based on oxides.
3. The glass substrate according to claim 1, further comprising Fe in an amount of 0.005 to 0.12% in terms of a content of Fe$_2$O$_3$.
4. The glass substrate according to claim 1, wherein an amount of Sn is 0.25% or less in terms of a content of SnO$_2$.

5. The glass substrate according to claim 1, wherein at least one main surface of the glass substrate has a surface roughness of 1.5 nm or less in terms of arithmetic average roughness Ra.

6. The glass substrate according to claim 1, having a devitrification temperature of 1,400° C. or lower.

7. The glass substrate according to claim 1, having a temperature $T_2$ of 1,700° C. or lower, the temperature $T_2$ being a temperature at which the glass has a viscosity of $10^2$ dPa·s.

8. A liquid-crystal antenna, comprising the glass substrate according to claim 1.

9. A high-frequency device, comprising the glass substrate according to claim 1.

* * * * *